Sept. 29, 1964      P. CORBIN      3,150,882

FRONT WHEEL SUSPENSION FOR MOTOR VEHICLES

Filed June 3, 1963      2 Sheets-Sheet 1

INVENTOR
Paul CORBIN
BY

ATTORNEYS

INVENTOR
Paul CORBIN
BY
ATTORNEYS

United States Patent Office 3,150,882
Patented Sept. 29, 1964

3,150,882
FRONT WHEEL SUSPENSION FOR
MOTOR VEHICLES
Paul Corbin, 7737 St. Denis St., Montreal,
Quebec, Canada
Filed June 3, 1963, Ser. No. 284,908
6 Claims. (Cl. 280—112)

The present invention relates to an automotive suspension and more particularly to a front wheel suspension for motor vehicles.

A main object of the invention resides in the provision of such a suspension adapted to cause canting or banking of the vehicle appropriately towards the inside of the curve when such a vehicle takes a turn at a relatively high speed.

A further object of the invention consists in providing a suspension for the front wheels of a motor vehicle wherein the said wheels will also be inclined or tilted towards the inside of the curve when the vehicle makes a turn.

Yet another object of the invention lies in the provision of a suspension of the above mentioned type wherein at least part of the weight of the vehicle body is shifted from the outside to the inside wheels while travelling in a curve.

These objects can be obtained with a front wheel suspension for motor vehicle made according to the invention, wherein there is provided a body frame for the vehicle body; a front wheel suspension frame pivotally mounted on the body frame and above the center of gravity of the body rocking about a central longitudinal axis of the body. The suspension further comprises a steering lever or sliding rod mounted for reciprocation on the suspension frame, transversely thereof, and opposed steering knuckle bars, provided rearwardly of the suspension frame, and wheels mounted on the knuckle bars intermediate the ends thereof. A pair of trailing arms is included which are articulated to each knuckle bar with one arm of each pair articulated to the suspension frame and the other arm connected to one end of the sliding rod. A leverage mechanism interconnects each knuckle bar to a fixed point on the suspension or body frame whereby reciprocation of the sliding rod in a curve causes the wheels to turn and bank towards the center of the curve while the vehicle body's center of gravity is shifted laterally to the outside of the curve.

Other objects of the invention will become apparent as the following description proceeds which has reference to the accompanying drawings wherein.

Figure 1:
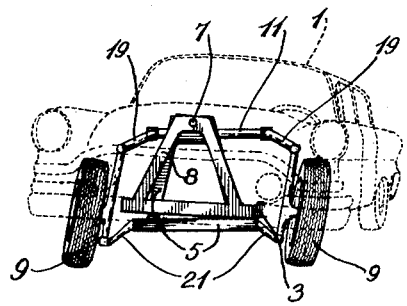
FIG. 1 is a schematic illustration of the front wheel suspension according to the invention.

FIG. 1 clearly illustrates what happens to a car 1 provided with a front wheel suspension according to the invention when the said car takes a turn on a flat curve. The vehicle body frame 3, which is suspended to the suspension frame 5 about a pivot axis 7, tends to bank inwardly due to the centrifugal force acting thereon and the fact that the suspension point is above the center of gravity. Simultaneously, wheels 9 are inclined or tilted also towards the inside of the curve.

Figure 2:
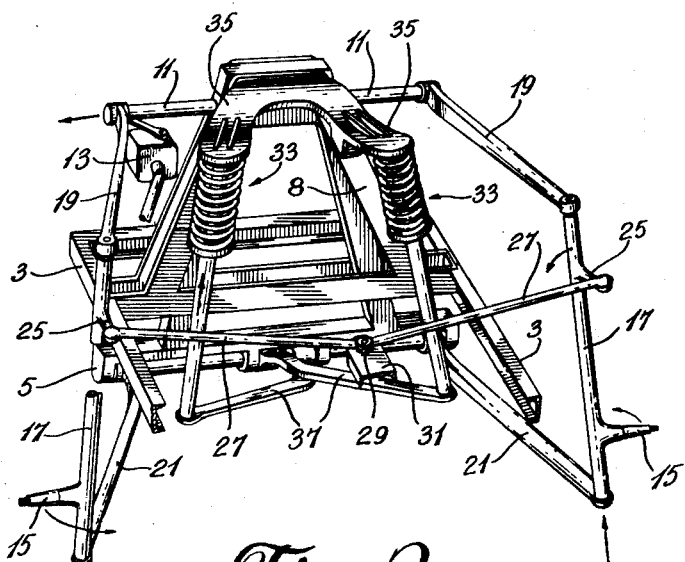
FIG. 2 is a perspective view of the front wheel suspension mechanism of the invention.
Figure 3:
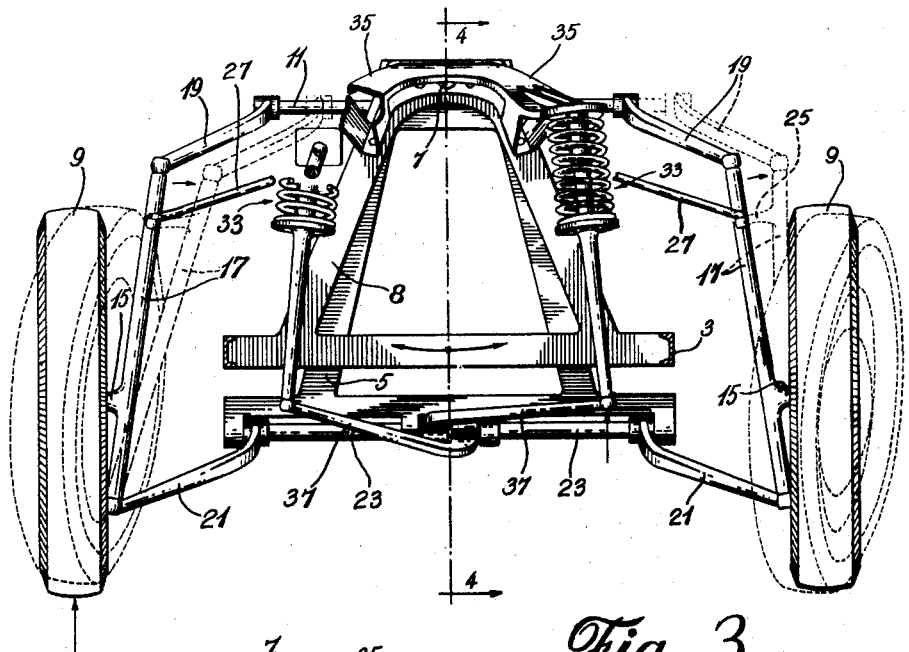
FIG. 3 is an elevation view taken from the rear of the vehicle looking frontward of the wheel suspension of the invention.
Figure 4:
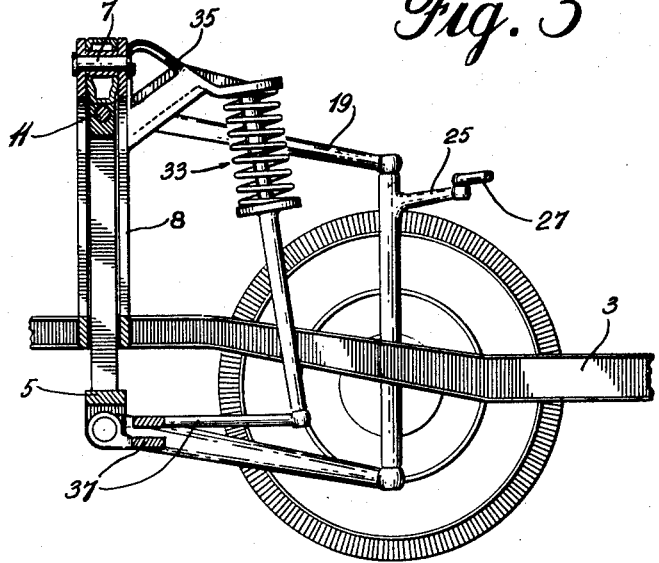
FIG. 4 is a cross-sectional view taken along line 4—4 of FIG. 3.

The suspension mechanism which makes the above results possible is illustrated in details in FIGS. 2, 3 and 4 wherein it is seen that the suspension frame 5 which is somewhat triangular in shape is pivotally mounted, at the upper end thereof, to the upper end of the vehicle body frame 3 at a point above the center of gravity of the vehicle body for rocking about a central longitudinal axis of the said body.

For simplicity in illustrating the invention, the vehicle body frame is identifiable here by part of the chassis 3 and the upright supports 8 at the forward end thereof.

As said previously, the body frame 3 is pivotally connected to the suspension frame 5 and this is best shown in FIG. 4 where it is seen that a pivot shaft 7 extends through both the upright support 8 and the suspension frame 5, the latter being introduced between the two lateral triangular plates of the support although other disposition may be resorted to such as placing the two frames side by side.

Extending through the upper portion of suspension frame 5 is a sliding bar or rod 11 adapted to reciprocate transversely of suspension frame 5.

Suitable steering means generally identified by numeral 13 is provided for causing reciprocation of the sliding rod 11 and is operable from inside the vehicle, as known.

Wheels 9 are adapted to be mounted on stub axles 15 rigid with and extending laterally of steering knuckle bars 17 intermediate the ends thereof. A pair of upper trailing arms 19 join the upper end of the knuckle bars 17 to one end of the sliding rod 11, each trailing arm 19 having one end secured to the steering sliding rod 11 while the other end is articulated by means of a ball joint to the knuckle bars 17.

In a similar manner, lower trailing arms 21 join the lower ends of the knuckle bars 17 to two transverse shafts 23 mounted for rotation beneath suspension frame 5: one end of lower arms 21 being secured to one end of one shaft 23 while the other end of each lower arm 21 is articulated at the lower end of the knuckle bars 17. It should be noted that stub axles 15 stand distant from the lower end of the knuckle bars 17.

Leverage means interconnect each knuckle bar, intermediate the ends thereof, and above the stub axles 15, to a fixed point on the suspension frame 5 or body frame 3, the leverage means comprising a steering arm 25 integral with each knuckle bar intermediate the ends thereof and a connecting rod 27 pivotally connected to arm 25 at one end and also pivotally connected at 29 to a fixed point on the suspension or body frame illustrated here by a central member 31 disposed substantially at the level of the axis pivot 7.

The two connecting rods 27 should be of the same length. Another arrangement would be to have rods 27 connected to the sides of frame 5 in substantial parallel relationship, when the wheels are in normal straight position.

For shifting at least part of the vehicle body weight from one side to the other in a curve, a shock absorbing means is provided interconnecting the body and the suspension frames, which means comprises the two rotatable shafts 23 mounted transversely on each side of the suspension frame 5 and to one end of which the lower arms 21 are secured. The shock absorbing means also includes a pair of shock absorber units 33 such as the resilient mechanical absorber unit shown in FIGS. 2, 3 and 4. One end of each unit is secured to a projection 35 extending rearwardly from the upright supports 8 on either side of a longitudinal axial plane of the body frame 3. The other end of each shock absorbing unit 33 is articulated at the other end to one end of a load transferring lever 37 the other end of which is secured to the shaft 23 located on the side of the vehicle opposite that of the shock absorbing unit to which it is articulated.

The general operation of the front wheel suspension of the invention is as follows:

It will readily be understood, with reference to FIG.

1, that when car 1 turns into a curve after wheels 9 have been properly steered, if the car has a certain speed, the body thereof will tend to pivot about pin 7 so as to shift the center of gravity on the outside of the curve thus forcing the car body to take a canting position as illustrated in FIG. 1, the degree of canting depending of course on the weight and speed of the vehicle.

As said previously, steering of wheels 9 is obtained by sliding rod 11 by means of the steering mechanism 13. FIG. 3 illustrates what happened by showing, in dotted lines, the position of wheels 9 after steering for taking a curve, the elevation view of FIG. 3 being from the rear forward as will be remembered.

When sliding rod 11 is shifted laterally to the right, as illustrated in FIG. 3, because of the articulation of the knuckle bars 17 to both the lower and upper arms 19 and 21 and because of the rigid connection of the other end of the lower arm to shaft 23, it will be understood that the knuckle bar will be forced into an inclined position thus bringing the wheels also in an inclined position as shown in dotted lines in FIG. 3. Also, and because of links 25 and connecting rods 27, the knuckle bars will pivot about their longitudinal axis thus forcing wheels 9 to turn. Consequently, not only will the wheels turn but they will also bank towards the inside of the curve.

If the vehicle travels at a certain speed, then the center of gravity thereof will be shifted to left (reference again to FIG. 3) and the shock absorber 33 on the left hand side will be compressed and because of the rigid connection of the transferring lever 37 to the rightward shaft 23 part of the load, the amount depending on the sharpness of the curve and the speed of the vehicle, will be transferred to the rightward wheel 9.

Obviously many changes in the details and construction as described above can be made without departing from the spirit of the invention and it is to be understood that no limitation is made to any particular form or arrangement of parts.

I claim:

1. In a front wheel suspension for motor vehicles, the combination comprising:
   (a) a body frame for a vehicle body;
   (b) a front wheel suspension frame pivotally mounted on the body frame above the center of gravity of the body for rocking about a central longitudinal axis of the body;
   (c) a steering rod mounted for reciprocation on said suspension frame, transversely thereof, and means to reciprocate said rod;
   (d) opposed steering knuckle bars, rearwardly of said suspension frame, and wheels mounted thereon intermediate the ends thereof for steering movement;
   (e) a pair of trailing arms articulated to each knuckle bar with one arm of each pair articulated to the suspension frame and the other arm connected to one end of the steering rod, and
   (f) leverage means interconnecting each knuckle bar and a fixed point on one of said frames whereby reciprocation of said rod in a curve causes said wheels to turn and bank towards the center of the curve.

2. In a front wheel suspension for motor vehicles, the combination comprising:
   (a) a body frame for a vehicle body;
   (b) an upright front wheel suspension frame pivotally mounted at the upper end and centrally thereof to the body frame above the center of gravity of the body for rocking about a central longitudinal axis of the body;
   (c) a steering rod mounted for reciprocation at the upper end of said suspension frame, transversely thereof, and means to reciprocate said rod;
   (d) opposed steering knuckle bars, rearwardly of said suspension frame, and wheels mounted thereon intermediate the ends thereof for steering movement;
   (e) a pair of arms articulated to each knuckle bar with one arm of each pair connected to the suspension frame and the other arm connected to one end of the steering rod, and
   (f) leverage means interconnecting each knuckle bar to a fixed point on one of said frames whereby reciprocation of said rod when the vehicle takes a curve causes said wheels to turn and bank towards the center of the curve.

3. A combination as claimed in claim 2, with shock absorbing means interconnecting said frames and adapted to shift at least part of the body load, supported by the wheel on the outer side in relation to the curve, to the wheel on the inner side.

4. In a front wheel suspension for motor vehicles, the combination comprising:
   (a) a body frame for a vehicle body;
   (b) an upright front wheel suspension frame pivotally mounted at the upper end and centrally thereof to the body frame above the center of gravity of the body rocking about a central longitudinal axis of the body;
   (c) a steering rod mounted for reciprocation at the upper end of said suspension frame, transversely thereof, and means to reciprocate said rod;
   (d) a steering knuckle bar on each side of said frames, rearwardly of said suspension frame, having a laterally extending wheel axle intermediate the ends thereof;
   (e) a pair of arms articulated to the ends of each knuckle bar with the upper arm connected to one end of the steering rod while the lower arm is connected to the suspension frame, and
   (f) leverage means interconnecting each knuckle bar, intermediate the ends thereof and above said axle, to a fixed point on one of said frames whereby reciprocation of said rod, when a vehicle takes a curve, causes said wheels to turn and bank towards the center of the curve.

5. A combination as claimed in claim 4, wherein said leverage means comprises a link rigid with each knuckle bar and connecting rods pivotally connected to said links and to a fixed point on said body frame substantially along the pivot axis of said frames.

6. A combination as claimed in claim 4 with shock absorbing means interconnecting said frames comprising:
   a rotatable shaft mounted transversely on each side of said suspension frame; said lower arms being secured to said shafts;
   a pair of shock absorbing units; each unit being secured at one end to said body frame, on one side thereof;
   a load transferring lever, for each unit, articulated at one end to the unit and secured, at the other end, to the shaft on the opposite side of said body.

References Cited in the file of this patent

UNITED STATES PATENTS

| | | |
|---|---|---|
| 2,029,735 | Minott | Feb. 4, 1936 |
| 2,200,798 | Megow | May 14, 1940 |
| 2,279,120 | Hurley | Apr. 7, 1942 |
| 2,625,232 | Lado | Jan. 13, 1953 |
| 2,998,263 | Muller | Aug. 29, 1961 |